H. A. TUTTLE.
REVERSING GEARING.
APPLICATION FILED JAN. 24, 1917.

1,246,502.

Patented Nov. 13, 1917.

Inventor,
Henry A. Tuttle
by [signature] Atty

UNITED STATES PATENT OFFICE.

HENRY A. TUTTLE, OF TAUNTON, MASSACHUSETTS.

REVERSING-GEARING.

1,246,502. Specification of Letters Patent. Patented Nov. 13, 1917.

Application filed January 24, 1917. Serial No. 144,282.

*To all whom it may concern:*

Be it known that I, HENRY A. TUTTLE, a citizen of the United States, residing at Taunton, in the county of Bristol, in the State of Massachusetts, have invented an Improvement in Reversing - Gearing, of which the following is a specification.

This invention relates to reversing gearing for connecting a continuously-rotating shaft with another shaft, whereby the latter may be driven forward or backward or may remain idle. In gearing of this type it is customary to employ a clutch-mechanism for connecting the driving-shaft with the driven-shaft for forward drive, and to employ suitable gearing, usually of the planetary type, which engages the driving-shaft and driven-shaft for reverse drive, and to provide for holding the clutch-mechanism disengaged and for adjusting or releasing the planetary gearing, whereby the drive-shaft may rotate freely, while the driven-shaft remains idle. The clutch-mechanism is sometimes adapted for operation by suitable actuating-mechanism, and the power transmitted through some element or elements which are movable axially for this purpose.

As for instance, sometimes the inclosing-case for the reverse drive gearing and parts connected therewith are movable axially and utilized to effect operation of the clutch mechanism.

There are objections to making the inclosing-case of the reverse drive mechanism and parts connected therewith movable axially, merely for the sake of transmitting the power from the actuating-means, and one of the objects of this invention is the provision of means whereby only one of the components of the reverse drive gearing is movable axially, independently of the other components of the gearing, and is utilized to transmit the power of the actuating-means.

Another object of the invention is the provision of thrust-pins or some equivalent means, extended through one of the components of the reverse drive gearing for operating the clutch-mechanism, which pins are adapted for engagement with the axially movable component of said gearing, thereby to operate the clutch-mechanism.

Another object of the invention is the provision of a clutch-mechanism arranged for directly connecting the driving and driven-shafts and an inclosing-case therefor, and two sets of thrust-pins with a wear-plate interposed between them, one set being extended through the wall of the inclosing-case of the clutch-mechanism, and the other set being extended through one of the components of the reverse drive gearing, said thrust-pins being movable axially to operate the clutch-mechanism.

Figure 1:
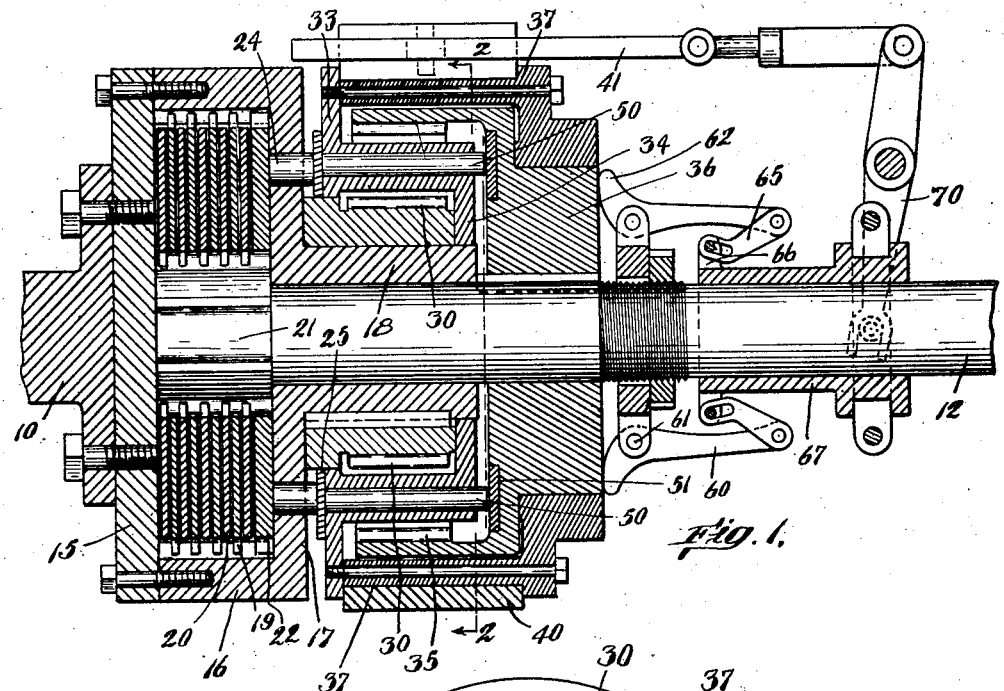
Figure 1 is a longitudinal, vertical section of a reversing gearing embodying this invention.
Figure 2:
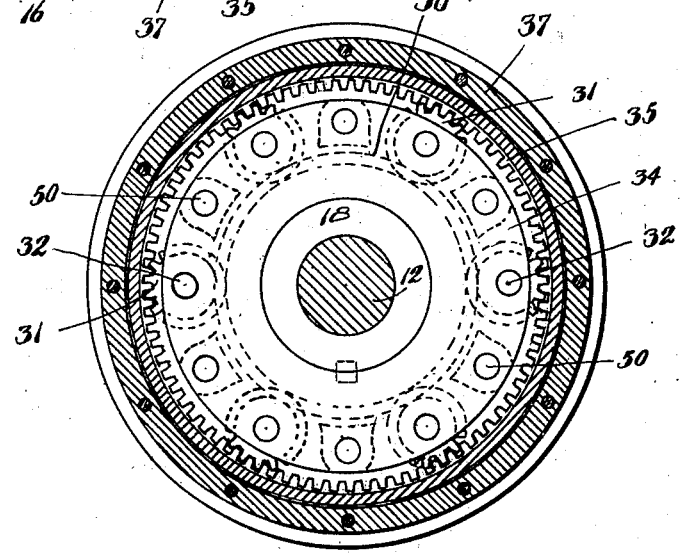
Fig. 2 is a transverse section taken on the dotted line 2—2 of Fig. 1.

In the reversing gearing here shown, as illustrating one embodiment of my invention, 10 represents the engine-shaft or drive-shaft, and 12 the propeller-shaft or driven-shaft. A clutch-case is herein provided for and forms a part of the clutch-mechanism, which is rigidly secured to the drive-shaft and is extended over upon the driven-shaft, it comprising a circular end-wall 15, bolted to a flange on the drive-shaft, and a cylindrical side-wall and circular end-wall 16, 17, secured to the end-wall 15, and a tubular cylindrical hub or extension 18, which extends over and is supported on the driven-shaft. Within this clutch-case a series of annular clutch-plates 19 and 20 are arranged, which are alternately disposed relatively to each other, some having their outer peripheries formed with projections which engage recesses in the interior of the side-wall 16 of said case, and others having their inner peripheries formed with projections which engage recesses in a hub 21, which may be secured to or formed on the driven-shaft. The clutch-mechanism here shown and described is adapted to provide a direct connection between the drive-shaft and driven-shaft when the components thereof are moved axially into engagement with each other and with the end wall 15.

The inner or endmost clutch-plate 22 of the series is arranged next the inner wall 17 of the case, and thrust-pins 24 are extended through said inner wall for engagement with said clutch-plate 22, thereby to move said plate axially and cause engagement of the several plates of the clutch. There may be several such thrust-pins 24 employed. These thrust-pins normally project from the wall 17, and are engaged by an annular wear-plate 25, and pressure upon said wear-plate acts to move all of the thrust-pins axially to operate the clutch-mechanism.

The reverse drive gearing here shown consists of a spur gear 30, rigidly secured to the hub 18 of the clutch-case, and hence with the drive-shaft, several pinions 31 engaging said spur gear, mounted on rods 32, having their ends supported by the walls 33 and 34, respectively, of a pinion carrier, and an internal gear 35 engaging said pinions having its hub 36, arranged on and splined to the driven-shaft, and, as here shown, said internal gear is movable axially on said shaft for a short distance sufficient to provide for moving suitable means which is employed for operating the clutch-mechanism, and an inclosing-case 37 is rigidly secured at one end to the wall 33 of the pinion-carrier and extends over the internal gear and onto the hub thereof.

A braking element 40 embraces the inclosing-case 37 which is adapted for operation by suitable means, not shown, connected with a bar 41 by which said case and associated parts may be restrained from rotation thereby to cause reverse drive of the driven shaft, and said braking element is also adapted for operation by said means to release the inclosing case, and when said case is thus released the driven-shaft is free and may remain idle, or may be rotated forward, according to whether the clutch-mechanism is engaged or disengaged. The reverse gearing thus described is a form to which my present invention is especially applicable, although it will be understood that it is also applicable to other forms of reverse gearing, but more particularly to those having the reverse drive gearing arranged between the clutch-mechanism and the actuating-means.

Herein, a plurality of long thrust-pins 50 are arranged to be supported by the pinion-carrier, they being extended therethrough longitudinally and adapted to project or to be projected at each end thereof. At one end, said thrust-pins bear against the wear-plate 25, and at the other end they may bear against an annular wear-plate 51, which is arranged in a space between the crown or inner face of the hub of the internal gear, and the inner end of the pinion-carrier, and preferably contained in a recess formed in the inner face of the crown of said gear, although it is obvious that said wear-plate may be omitted. Upon axial movement of the internal gear, which, as here shown, is one of the components of the reverse drive gearing, said long thrust pins will be moved axially to correspondingly move the wear-plate 25, and thrust-pins 24, which latter will apply direct pressure to or upon the clutch-plates and cause engagement thereof, thus to connect the driven-shaft with the drive-shaft.

The actuating-means for axially moving the internal gear may be of any of the many different types, but, as here shown, consists of levers 60, pivoted at 61, to an adjustable support and having projecting end-portions 62, adapted for engagement with the end of the hub of the internal gear, said levers being pivotally connected at their other ends to angularly formed slotted links 65, arranged on ears 66 on a slidable sleeve 67 mounted on the driven-shaft and having an actuating-lever 70 connected with it by which it may be moved longitudinally on the shaft to operate said levers. Said actuating-member 70 is also connected with the bar 41 of the brake-mechanism for the reverse drive gearing, so that it may be employed to operate both the clutch-mechanism and the reverse drive gearing.

In this connection it may be stated that said slidable sleeve normally occupies a middle or predetermined position on the driven-shaft when the drive-shaft is rotating freely and the driven-shaft is idle, and it is movable in one direction from normal to operate the clutch-mechanism for forward drive and in the other direction from normal to operate the brake-mechanism for reverse drive.

I claim:—

1. In a reversing gearing, the combination of a driving-shaft, a driven-shaft, clutch-mechanism for connecting said shafts for forward drive, gearing connected with said shafts for reverse drive including a spur gear, pinions, a carrier for the pinions, and an internal gear, and axially-movable means to operate the clutch-mechanism including axially movable thrust-pins borne by the pinion-carrier and arranged for engagement with the internal gear, and actuating-means to move said internal gear axially and correspondingly move said thrust-pins to effect operation of the clutch-mechanism.

2. In a reversing gearing, the combination of a driving-shaft, a driven-shaft, clutch-mechanism for connecting said shafts for forward drive, gearing connected with said shafts for reverse drive, including a spur gear, pinions, a carrier for the pinions, and an internal gear, longitudinally-movable thrust-pins engaging one of the clutch-components, a wear-ring engaging said pins, and other longitudinally-movable thrust-pins engaging said wear-ring which are extended through the pinion-carrier and engage the internal gear, and actuating-means for moving axially said internal gear to in turn move said pins.

3. In a reversing gearing, the combination of a driving-shaft, a driven-shaft, clutch-mechanism for connecting said shafts for forward drive, gearing connected with said shafts for reverse drive, one of the components of which is movable axially independently of the other components thereof, axially movable thrust-pins for moving the clutch-components into engagement with each other, said pins being extended through one of the components of the reverse drive gearing and engaging the axially movable component thereof, and actuating-means for moving said axially movable component and correspondingly moving the thrust-pins to effect operation of the clutch-mechanism.

4. In a reversing gearing, the combination of a driving shaft, a driven shaft, clutch mechanism for connecting said shafts for forward drive, gearing connected with said shafts for reverse drive including an internal gear which is movable axially independently of the other components thereof, axially movable means for moving the clutch components into engagement with each other, said means being extended through one of the components of the reverse drive gearing and engaging the axially movable internal gear, and actuating means for moving said internal gear axially and correspondingly moving the means for operating the clutch mechanism.

5. In a reversing gearing, the combination of a driving shaft, a driven shaft, clutch mechanism for connecting said shafts for forward drive, gearing connected with said shafts for reverse drive including an internal gear which is movable independently of the other components thereof, axially movable means for moving the clutch components into engagement with each other and engaging the axially movable internal gear, and actuating means for moving said internal gear axially and correspondingly moving the means for operating the clutch mechanism.

6. In a reversing gearing, the combination of a driving-shaft, a driven-shaft, clutch-mechanism for connecting said shafts for forward drive, gearing connected with said shafts for reverse drive, one of the components of which is movable axially independently of the other components thereof, axially movable thrust-pins engaging one of the clutch-components, a wear-ring engaging said pins and other axially movable thrust-pins engaging said wear-ring and extended through another component of the reverse drive gearing and engaging the axially movable component thereof, and actuating-means for moving said axially movable component and correspondingly moving the pins to effect operation of the clutch-mechanism.

7. In a reversing gearing, the combination of a driving-shaft, a driven-shaft, clutch-mechanism for directly connecting said shafts for forward drive, gearing connected with said shafts for reverse drive, one of the components of which is movable axially independently of the other components thereof, axially movable thrust-pins for moving the clutch-components into engagement with each other, said pins being extended through one of the components of the reverse drive gearing and engaging the axially movable component thereof, and actuating-means for moving said axially movable component and correspondingly moving the thrust-pins to effect operation of the clutch-mechanism, said reverse drive gearing being arranged between the clutch-mechanism and the actuating-means.

8. In a reversing gearing, the combination of a driving-shaft, a driven-shaft, clutch-mechanism for directly connecting said shafts for forward drive, an inclosing-case therefor, gearing connected with said shafts for reverse drive, one of the components of which is movable axially independently of the other components thereof, two sets of longitudinally movable thrust-pins for moving the clutch-components, one set being extended through the wall of the inclosing-case of the clutch-components, the other set being extended through one of the components of the reverse drive gearing and engaging the axially movable component thereof, a wear-ring interposed between the two sets of the thrust-pins, and actuating-means for moving said axially movable component and correspondingly moving the thrust-pins to effect operation of the clutch-mechanism.

9. In a reversing gearing, the combination of a driving-shaft, a driven-shaft, clutch-mechanism for connecting said shafts for forward drive, planetary gearing connected with said shafts for reverse drive, having a pinion carrier and controlling means for said reverse drive gearing, thrust-pins arranged for longitudinal movement to operate the clutch-mechanism, said thrust-pins being extended through the pinion-carrier of the planetary gearing, and actuating-means for said pins, adapted for connection with the controlling-means for the planetary gearing.

10. In a reversing gearing, the combination of a driving-shaft, a driven-shaft, clutch-mechanism for connecting said shafts for forward drive, gearing connected with said shafts for reverse drive, controlling means for the reverse drive gearing, two sets of longitudinally movable thrust-pins, one of the sets being associated with the clutch-mechanism and rotatable with the driving-shaft, and the other set extended through one of the components of the reverse drive gearing and rotatable with the driven-shaft, a wear-plate interposed between said sets of pins, and actuating-means for said pins, adapted for connection with the controlling-means for the reverse drive gearing.

In testimony whereof, I have signed my name to this specification, in the presence of two subscribing witnesses.

HENRY A. TUTTLE.

Witnesses:
 FREDERICK C. BURBANK,
 ALFRED H. HENSHALL.

Copies of this patent may be obtained for five cents each, by addressing the "Commissioner of Patents, Washington, D. C."